US012619597B2

(12) United States Patent \
 Grob

(10) Patent No.: US 12,619,597 B2 \
(45) Date of Patent: May 5, 2026

(54) REAL-TIME TARGET OBJECT TRACKING USING UNPROCESSED DATA ON RECEIPT LEVEL

(71) Applicant: SAP SE, Walldorf (DE)

(72) Inventor: Oliver Grob, Illingen (DE)

(73) Assignee: SAP SE, Walldorf (DE)

( * ) Notice: Subject to any disclaimer, the term of this patent is extended or adjusted under 35 U.S.C. 154(b) by 12 days.

(21) Appl. No.: 18/919,217

(22) Filed: Oct. 17, 2024

(65) Prior Publication Data

US 2026/0111412 A1 Apr. 23, 2026

(51) Int. Cl.
*G06F 16/00* (2019.01)
*G06F 16/23* (2019.01)

(52) U.S. Cl.
CPC ...... *G06F 16/2365* (2019.01); *G06F 16/2379* (2019.01)

(58) Field of Classification Search
CPC ....... G06F 16/2365; G06F 16/00; G06F 16/23
See application file for complete search history.

(56) References Cited

U.S. PATENT DOCUMENTS

2004/0073900 A1* 4/2004 Scott ......................... G06F 8/65
717/170
2025/0123906 A1* 4/2025 Zhang .................... G06F 9/451

* cited by examiner

*Primary Examiner* — Cheryl Lewis
(74) *Attorney, Agent, or Firm* — Mintz Levin Cohn Ferris Glovsky and Popeo, P.C.

(57) ABSTRACT

Arrangements for real-time target object tracking using unprocessed data on receipt level are provided. Initial data corresponding to activity of a target object may be received. Unprocessed data may be generated based on the initial data. The unprocessed data may include a distinct plurality of chronology indicators and corresponding target object counts. A chronology indicator of an actual count of the target object may be determined. Transactions having a chronology indicator equal to or before the chronology indicator of the actual count may be identified. Selective compilation may be performed based only the identified unprocessed data having a chronology indicator equal to or before the chronology indicator of the actual count. Based on the selective compiling and the actual count of the target object, target object information in a database may be updated.

20 Claims, 6 Drawing Sheets

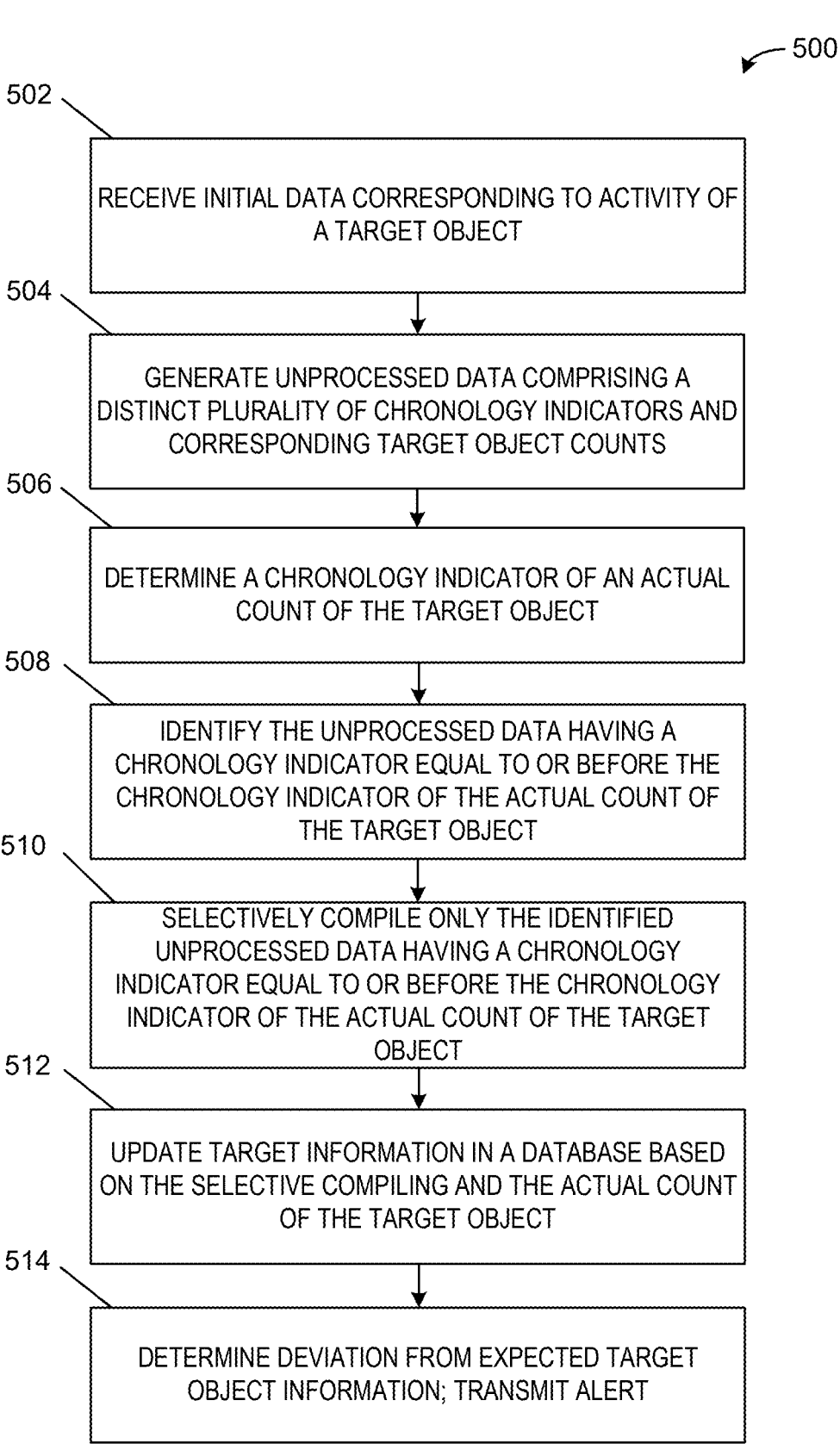

500

502

RECEIVE INITIAL DATA CORRESPONDING TO ACTIVITY OF A TARGET OBJECT

504

GENERATE UNPROCESSED DATA COMPRISING A DISTINCT PLURALITY OF CHRONOLOGY INDICATORS AND CORRESPONDING TARGET OBJECT COUNTS

506

DETERMINE A CHRONOLOGY INDICATOR OF AN ACTUAL COUNT OF THE TARGET OBJECT

508

IDENTIFY THE UNPROCESSED DATA HAVING A CHRONOLOGY INDICATOR EQUAL TO OR BEFORE THE CHRONOLOGY INDICATOR OF THE ACTUAL COUNT OF THE TARGET OBJECT

510

SELECTIVELY COMPILE ONLY THE IDENTIFIED UNPROCESSED DATA HAVING A CHRONOLOGY INDICATOR EQUAL TO OR BEFORE THE CHRONOLOGY INDICATOR OF THE ACTUAL COUNT OF THE TARGET OBJECT

512

UPDATE TARGET INFORMATION IN A DATABASE BASED ON THE SELECTIVE COMPILING AND THE ACTUAL COUNT OF THE TARGET OBJECT

514

DETERMINE DEVIATION FROM EXPECTED TARGET OBJECT INFORMATION; TRANSMIT ALERT

FIG. 5

REAL-TIME TARGET OBJECT TRACKING USING UNPROCESSED DATA ON RECEIPT LEVEL

TECHNICAL FIELD

The subject matter described herein relates generally to data processing and, in particular, to leveraging unprocessed data on receipt level for real-time target object tracking.

BACKGROUND

Many organizations may rely on software applications including, for example, enterprise resource planning (ERP) software and/or the like. These applications may provide a variety of functionalities including, for example, object surveying or auditing, invoicing, production, logistics, procurement, and/or the like. In an enterprise environment, object information in an ERP system is updated with activity data from a register device through a survey system. Conventional survey systems collect target object activity throughout the day and then compiles the data and updates the ERP system at the end of the day. Oftentimes, such compilation of target object activity leads to wrong physical/actual count postings in ERP, for example, if target object activity occurs between a count at the shelf and posting of the count information to the ERP.

SUMMARY

Methods, systems, and articles of manufacture, including computer program products, are provided for leveraging unprocessed data on receipt level for real-time target object tracking. In one aspect, a computer-implemented method includes receiving initial data corresponding to activity of a target object; generating unprocessed data, wherein the unprocessed data comprises a distinct plurality of chronology indicators and corresponding target object counts, based on the initial data; determining a chronology indicator of an actual count of the target object; identifying the unprocessed data having a chronology indicator equal to or before the chronology indicator of the actual count of the target object; selectively compiling only the identified unprocessed data having a chronology indicator equal to or before the chronology indicator of the actual count of the target object; and updating target information in a database based on the selective compiling and the actual count of the target object.

In some variations one or more of the following can optionally be included. The selective compiling includes filtering out the unprocessed data having a chronology indicator after the chronology indicator of the actual count and before the updating. The unprocessed data includes individual target object activity as per receipt data from a register device. The unprocessed data corresponds to target object activity associated with a plurality of individuals. The target object is a wanted object associated with at least a number of activities within a predetermined time period. The updated target information includes an object identification code and an updated quantity of the object. The computer-implemented method further includes determining that the updated target information in the database deviates from expected target object information; and transmitting an alert to a computing device.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 depicts a flowchart illustrating a process for implementing an intelligent survey system in accordance with some example embodiments.

When practical, similar reference numbers denote similar structures, features, or elements.

DETAILED DESCRIPTION

Aspects of the disclosure provide a technical solution that addresses problems associated with accurately and efficiently updating object and accounting information in a resource planning system.

Figure 1:
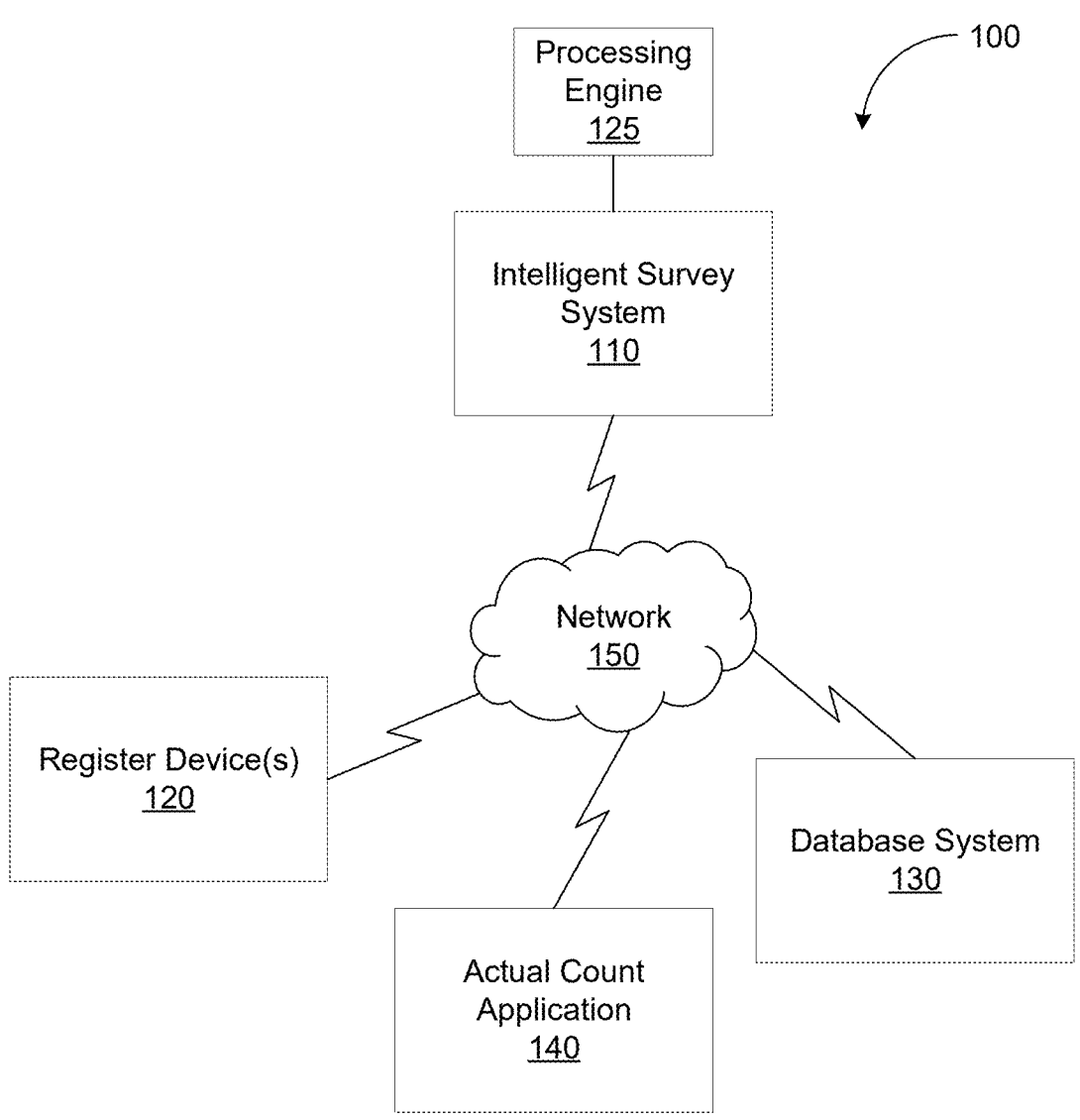
FIG. 1 depicts an illustrative computing environment for intelligent surveying in accordance with some example embodiments.

FIG. 1 depicts an illustrative computing environment for intelligent surveying in accordance with some example embodiments. Referring to FIG. 1, the computing environment 100 may include one or more computing devices and/or other computing systems. For example, computing environment 100 may include an intelligent survey system 110, register device(s) 120, a database system 130 (also referred to plainly as "ERP" herein), and an actual count (also referred to as physical inventory count, or "PIC") application 140. Intelligent survey system 110 may include one or more computing devices configured to perform one or more of the functions described herein. Intelligent survey system 110 may differentiate unprocessed target object activity using uncompiled target object activity with chronology indicators to ensure correct updating of the database system 130.

Referring again to FIG. 1, the intelligent survey system 110, the register device(s) 120, the database system 130, and the PIC application 140 may be communicatively coupled via a network 150. The network 150 may be a wired and/or wireless network including, for example, a wide area network (WAN), local area network (LAN), a virtual local area network (VLAN), the Internet, and/or the like.

In an enterprise environment, object information in the database system 130 is updated with activity data from the register device(s) 120 through the intelligent survey system 110. Conventionally, this is often performed at the end of the day. For example, prior/standard survey systems collect target object activity throughout the day and then compiles the data and updates the ERP system.

The register device(s) 120 may be used to post object activities (e.g., activities as per receipt data). Typically, based on a scanned article unique identification number (e.g., Global Trade Item Number (GTIN)) and a captured quantity, the register device(s) 120 determines the object price for the relevant article. In addition, it includes and forwards the payment method, the amount due, and customer returns. The data transaction number, the cashier, the date, and the time of the activity may also be included. This data may be stored in a log (e.g., a transaction log).

The intelligent survey system 110 may include a processing engine 125 that collects activity data from connected locations. Transaction data may be received in the form of log data, which may be processed by the processing engine 125. The activity data may sent to follow-on applications or made available to consuming applications (e.g., such as database system 130). In carrying out object surveys, the intelligent survey system 110 may view, analyze, and/or adjust data in the processing engine 125. This includes viewing data transferred from the register device(s) 120, analysis and correction of errors (e.g., correct unknown article numbers, applying an target object activity change to the correct article), carrying out checks (e.g., to ensure that all data is completely transferred to the ERP and there are no activities missing), adjusting object information (e.g., after an activity, subtracting from object information maintained in the ERP), updating target object activity and financial information (e.g., after an target object activity, updating account information), and/or the like.

Oftentimes the object information in the ERP is incorrect as soon as a location opens in the morning and the first objects are sold, because there is no direct update to the ERP. Such a problem may arise when performing an actual/physical count (PIC). An associate counts the number of available objects at the shelf and this information is then updated in the ERP. To cover the already sold objects on that day, a survey system can send upon request the object activities of that day which have not been updated to the ERP as compiled unprocessed target object activity. A PIC application can use that number to calculate the correct availability of an object.

Figure 2:
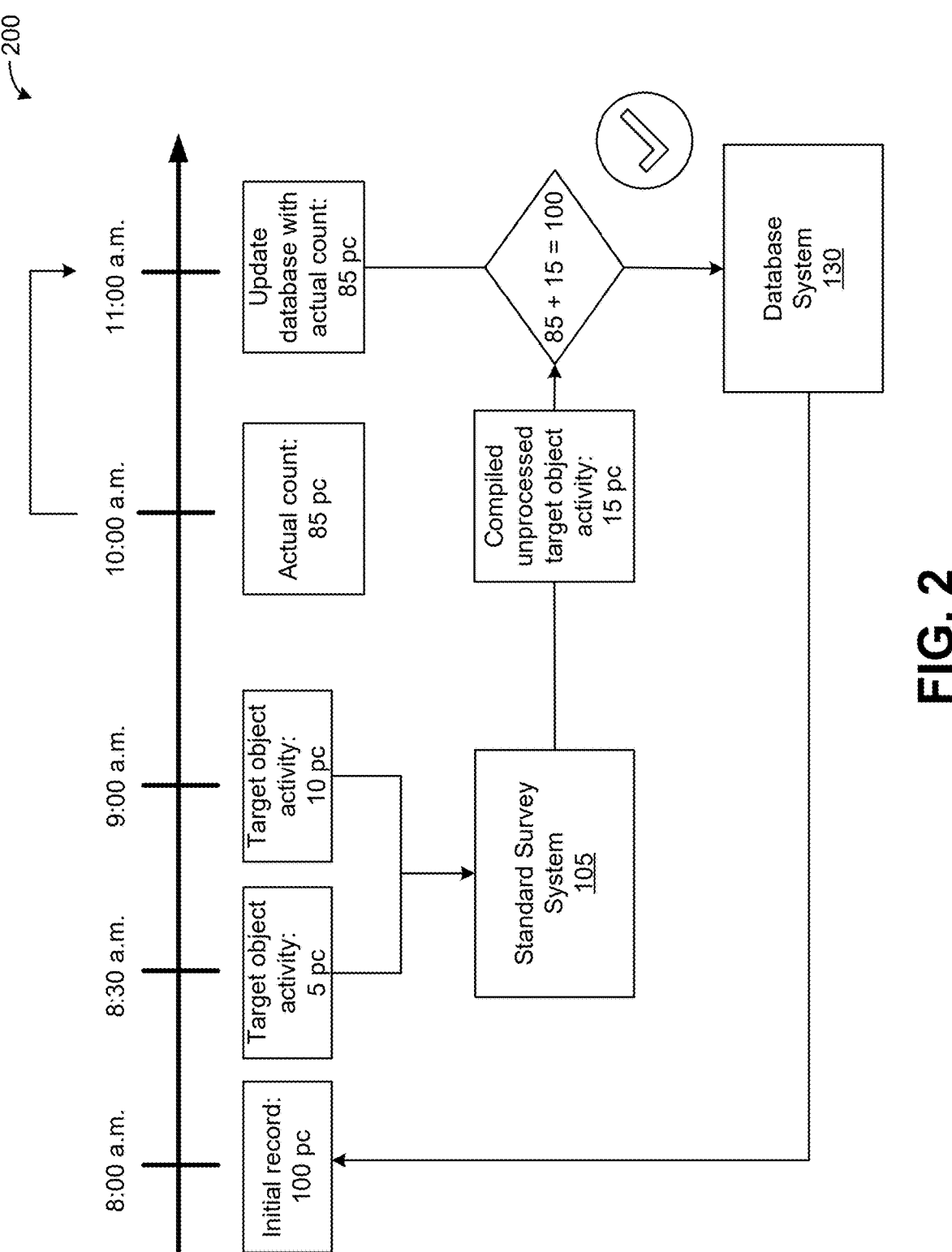
FIG. 2 depicts an event diagram illustrating standard surveying in accordance with some prior processes.

FIG. 2 depicts an event diagram 200 illustrating standard surveying in accordance with some prior processes. More specifically, FIG. 2 depicts an event diagram 200 illustrating an actual count and correction with compiled unprocessed target object activity in accordance with some prior processes.

As shown in FIG. 2, an target object record may begin with 100 pieces in the ERP. Then, at various times throughout the day, activity data may be generated. For example, at 8:30 a.m., 5 pieces might be sold, and at 9:00 a.m., 10 pieces might be sold. This information may be sent to a standard survey system 105, but is not yet transferred/posted to the database system 130. An actual count performed (e.g., at 10:00 a.m.) may determine that there are 85 pieces available. The PIC may be sent directly to the database system 130, which may be updated with the PIC (e.g., at 11:00 a.m.). In this case, the standard survey system 105 may compile the unprocessed target object activity (e.g., 5+10=15 pieces) which, when added to the actual count (15+85=100), provides the correct information to the database system 130.

But PICs typically involve several count tasks and the posting in the ERP is performed after all tasks are finished.

This can cause a problem, for example, if there are objects sold in between the count of an object and the final update of the target object information to the ERP. Such a scenario is illustrated in FIG. 3.

Figure 3:
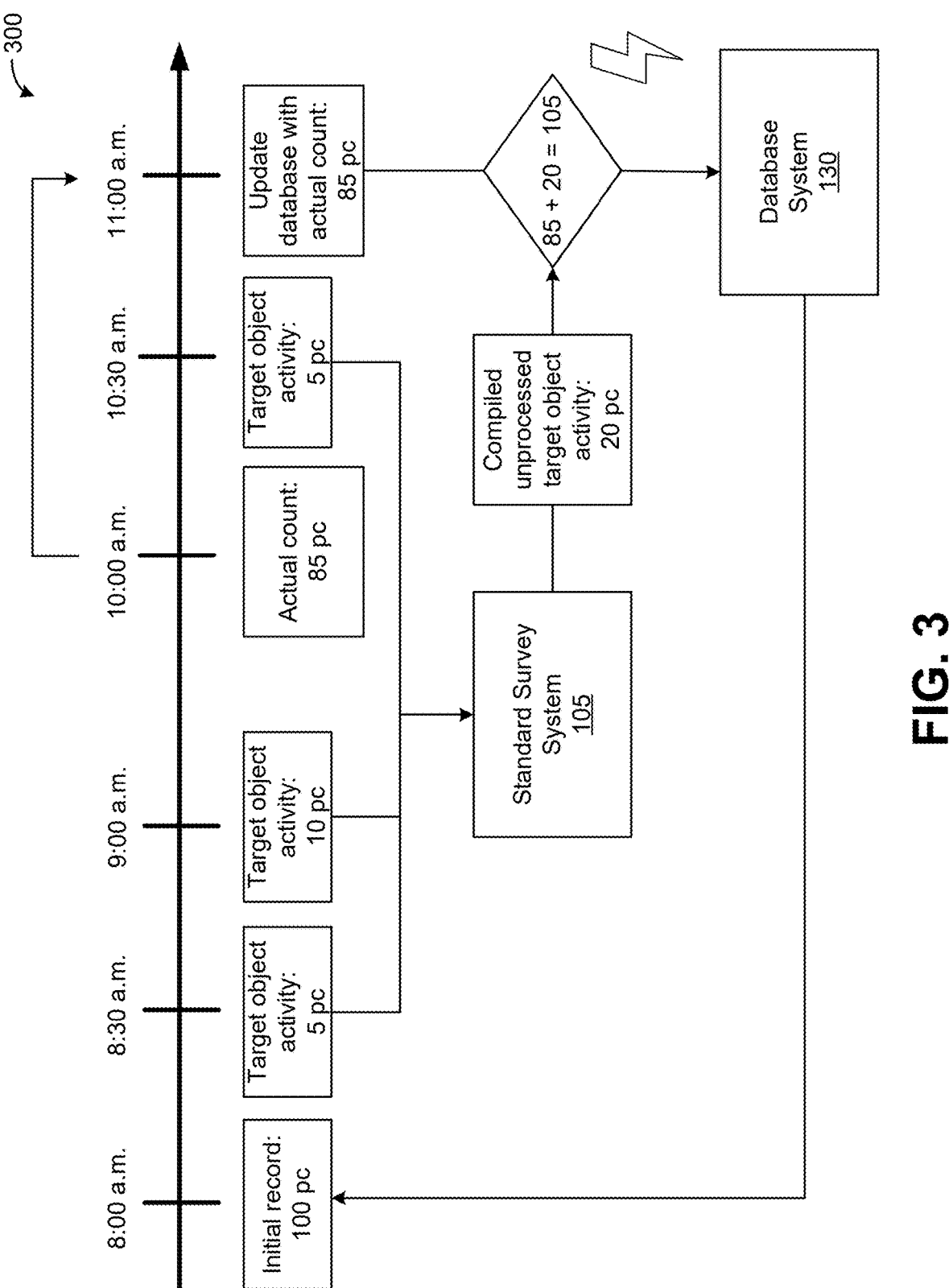
FIG. 3 depicts an event diagram illustrating standard surveying in accordance with some prior processes.

FIG. 3 depicts an event diagram 300 illustrating standard surveying in accordance with some prior processes. More specifically, FIG. 3 depicts an event diagram 300 illustrating an actual count and correction with compiled unprocessed target object activity and intermediate in accordance with some prior processes. In FIG. 3, an target object record may begin with 100 pieces in the ERP. Then, at various times throughout the day, activity data may be generated. For example, at 8:30 a.m., 5 pieces might be sold, and at 9:00 a.m., 10 pieces might be sold. An actual count performed (e.g., at 10:00 a.m.) may determine that there are 85 pieces available. The PIC may be sent directly to the database system 130, which may be updated with the PIC (e.g., at 11:00 a.m.). However, before the ERP is updated with the count of 85, an intermediate target object activity may occur (e.g., 5 pieces at 10:30 a.m.). If a PIC application now updates to the ERP, it would receive the compiled unprocessed target object activity from the standard survey system 105, which would be 20 pieces (5+10+5=20). The standard survey system 105 would send the object amount of 20 to the database system 130. The PIC application takes the 85, adds the 20 and would update the ERP to 105 which would be inaccurate.

Figure 4:
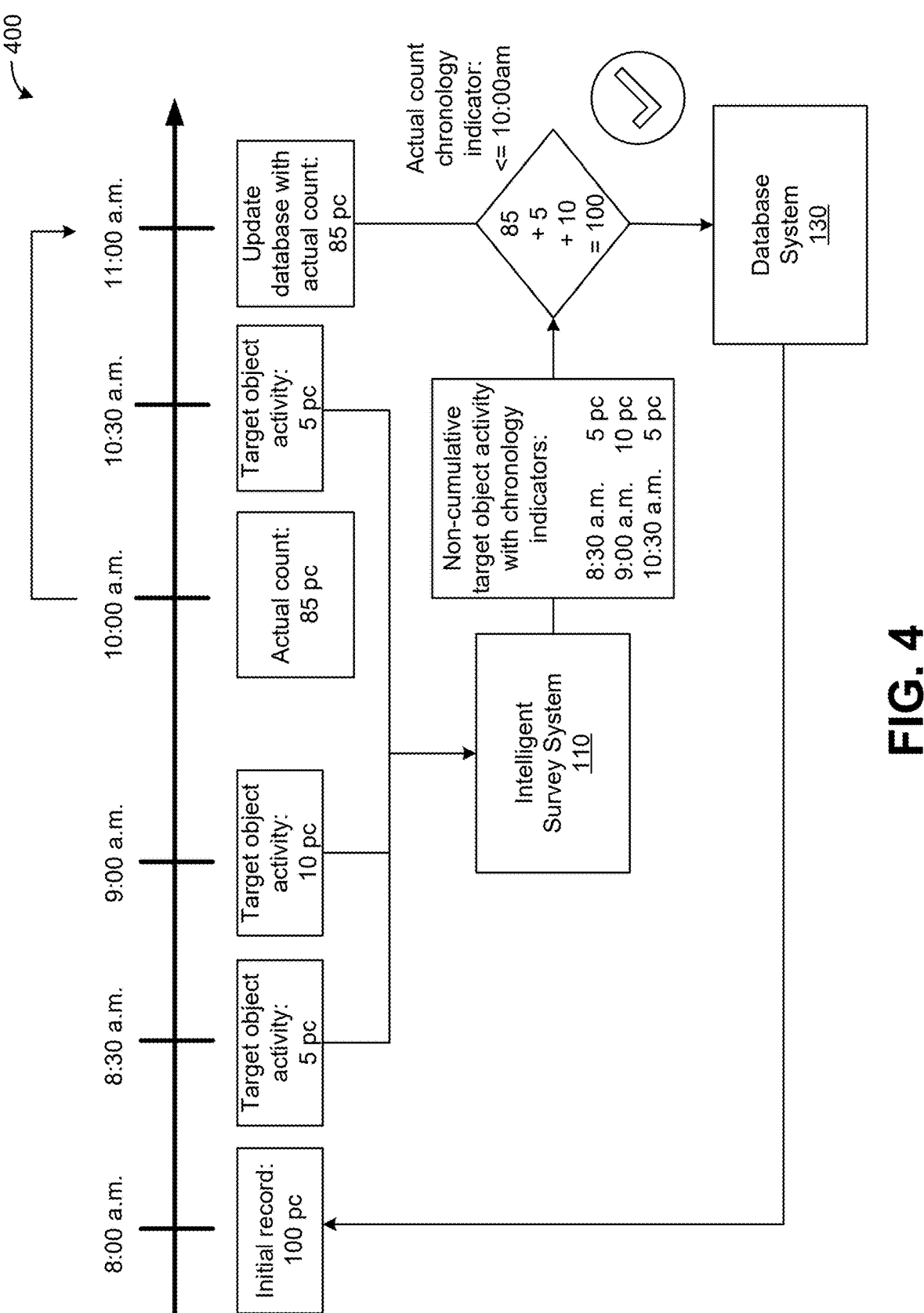
FIG. 4 depicts an event diagram implementing intelligent surveying in accordance with some example embodiments.

To solve this problem, FIG. 4 depicts an event diagram implementing intelligent surveying in accordance with some example embodiments. More specifically, FIG. 4 depicts an event diagram 400 illustrating an actual count and correction with non-cumulative unprocessed target object activity and intermediate activities in accordance with some example embodiments. FIG. 5 depicts a flowchart 500 illustrating a process for implementing an intelligent survey system in accordance with some example embodiments. FIGS. 4 and 5 will be discussed together.

Referring to FIG. 5, at step 502, intelligent survey system 110 may receive initial data corresponding to activity of a target object. For example, intelligent survey system 110 may receive activity data from register device(s) 120. In some examples, the unprocessed data includes individual target object activity as per receipt data from a register device. In some examples, the unprocessed data corresponds to target object activity associated with a plurality of individuals. The object may be a wanted object associated with at least a number of activities within a predetermined time period.

At step 504, intelligent survey system 110 may generate unprocessed data based on the initial data. The unprocessed data may include a distinct plurality of chronology indicators and corresponding target object counts. Unprocessed data may include information which has not been processed or transferred to the ERP.

Referring to FIG. 4, for example, an target object record may begin with 100 pieces in the ERP. Then, at various times throughout the day, activity data may be generated. For example, at 8:30 a.m., 5 pieces might be sold; at 9:00 a.m., 10 pieces might be sold; and at 10:30 a.m., 5 pieces might be sold. In some aspects of the present disclosure as shown in FIG. 4, the intelligent survey system 110 may send, to the PIC application, the unprocessed data as detailed information on a activities-as-per-receipt level (non-cumulative) with corresponding chronology indicators. For example, "8:30 a.m., 5 pc; 9:00 a.m., 10 pc; 10:30 a.m. 5 pc."

At step 506, intelligent survey system 110 may determine a chronology indicator of an actual count of the target object. An actual/physical count may involve measuring, counting, and/or weighing objects and entering the results in a system (e.g., in database system 130). Retailors normally use periodic physical survey and continuous physical survey procedures. In periodic physical surveying, all objects are counted on a specific key date. Continuous periodic physical surveying is performed for parts of the object across a physical year such that each article is counted at least once. A PIC can confirm that the supply levels recorded in a management system are accurate.

At step 508, intelligent survey system 110 may identify unprocessed data having a chronology indicator equal to or before the chronology indicator of the actual count of the target object.

At step 510, intelligent survey system 110 may selectively compile only the unprocessed data having a chronology indicator equal to or before the chronology indicator of the actual count of the target object. In some examples, the selective compiling may include filtering out the unprocessed data having a chronology indicator after the chronology indicator of the actual count and before the updating.

At step 512, intelligent survey system 110 may update target object information in a database (e.g., ERP database) based on the selective compiling and the actual count of the target object. In some examples, the updated target information may include an object identification code and an updated quantity of the object.

Returning to FIG. 4, for example, a PIC application (e.g., PIC application 140) may receive the unprocessed target object activity with chronology indicators and can efficiently identify the intermediate activities occurring in between the time when the count was performed (e.g., at 10:00 a.m.) and when the actual count is updated to the ERP (e.g., at 11:00 a.m.). In addition, the PIC application can differentiate which are relevant based on the chronology indicator of the object count (10:00 a.m.). For example, the PIC application can differentiate between activities occurring before the time the PIC count was performed (e.g., occurring before 10:00 a.m.) and the intermediate activities (e.g., occurring between 10:00 a.m. and 11:00 a.m.). All object activities occurring before the PIC chronology indicator are considered, and those after the PIC chronology indicator are not. With that, the PIC application takes the PIC of 85 and adds the object amount of 5 and 10 from 8:30 a.m. and 9:00 a.m., respectively, but skips the object amount of 5 from 10:30 a.m. As a result, the posting in the database system 130 results in 85+5+10=100, which checks out as the correct object count in the database system 130. With the differentiation of the unprocessed target object activity (e.g., sending uncompiled target object activity with chronology indicators), the PIC application can consider only the relevant unprocessed target object activity and ensure a correct updating of the database system 130.

In some embodiments, at step 514, intelligent survey system 110 may determine that the updated target information in the database deviates from expected target object information. Based on the determination, intelligent survey system 110 may transmit an alert to a computing device (e.g., an administrative or user computing device for further surveying).

Advantageously, among other things, intelligent survey system 110 may track object availability in real-time to ensure accuracy of postings to the database system 130 and handle omnichannel activities.

Figure 6:
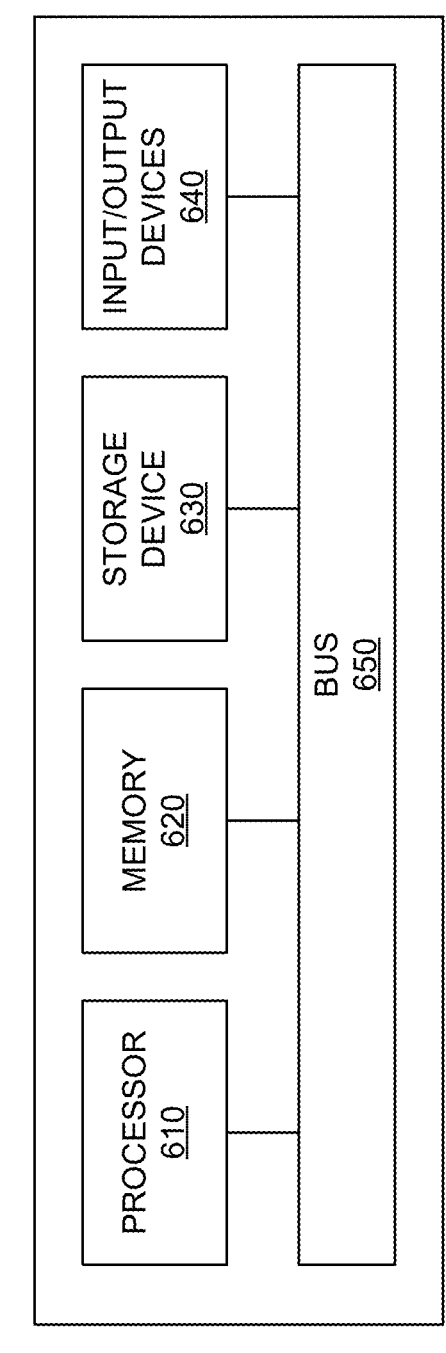
FIG. 6 depicts a block diagram illustrating a computing system, in accordance with some example embodiments.

FIG. 6 depicts a block diagram illustrating a computing system 600 consistent with implementations of the current subject matter. Referring to FIGS. 1-6, the computing system 600 can be used to implement the intelligent survey system 110 and/or any components therein.

As shown in FIG. 6, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, the intelligent survey system 110. In some implementations of the current subject matter, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a solid-state device, a floppy disk device, a hard disk device, an optical disk device, a tape device, and/or any other suitable persistent storage means. The input/output device 640 provides input/output operations for the computing system 600. In some implementations of the current subject matter, the input/output device 640 includes a keyboard and/or pointing device. In various implementations, the input/output device 640 includes a display unit for displaying graphical user interfaces.

According to some implementations of the current subject matter, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some implementations of the current subject matter, the computing system 600 can be used to execute various interactive computer software applications that can be used for organization, analysis and/or storage of data in various (e.g., tabular) format (e.g., Microsoft Excel®, and/or any other type of software). Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method comprising:

receiving initial data corresponding to activity of a target object;

generating unprocessed data, wherein the unprocessed data comprises a distinct plurality of chronology indicators and corresponding target object counts, based on the initial data;

determining a chronology indicator of an actual count of the target object;

identifying the unprocessed data having a chronology indicator equal to or before the chronology indicator of the actual count of the target object;

selectively compiling only the identified unprocessed data having a chronology indicator equal to or before the chronology indicator of the actual count of the target object; and updating target information in a database based on the selective compiling and the actual count of the target object.

Example 2: The computer-implemented method of Example 1, wherein the selective compiling comprises filtering out the unprocessed data having a chronology indicator after the chronology indicator of the actual count and before the updating.

Example 3: The computer-implemented method of any of Examples 1-2, wherein the unprocessed data comprises individual target object activity as per receipt data from a register device.

Example 4: The computer-implemented of any of Examples 1-3, wherein the unprocessed data corresponds to target object activity associated with a plurality of individuals.

Example 5: The computer-implemented of any of Examples 1-4, wherein the target object is a wanted object associated with at least a number of activities within a predetermined time period.

Example 6: The computer-implemented of any of Examples 1-5, wherein the updated target information comprises an object identification code and an updated quantity of the object.

Example 7: The computer-implemented of any of Examples 1-6, further comprising:

determining that the updated target information in the database deviates from expected target object information; and transmitting an alert to a computing device.

Example 8: A system comprising:

at least one processor; and at least one memory including program code which when executed causes the system to provide operations comprising:

receiving initial data corresponding to activity of a target object;

generating unprocessed data, wherein the unprocessed data comprises a distinct plurality of chronology indicators and corresponding target object counts, based on the initial data;

determining a chronology indicator of an actual count of the target object;

identifying the unprocessed data having a chronology indicator equal to or before the chronology indicator of the actual count of the target object;

selectively compiling only the identified unprocessed data having a chronology indicator equal to or before the chronology indicator of the actual count of the target object; and updating target information in a database based on the selective compiling and the actual count of the target object.

Example 9: The system of Example 8, wherein the selective compiling comprises filtering out the unprocessed data having a chronology indicator after the chronology indicator of the actual count and before the updating.

Example 10: The system of any of Examples 8-9, wherein the unprocessed data comprises individual target object activity as per receipt data from a register device.

Example 11: The system of any of Examples 8-10, wherein the unprocessed data corresponds to target object activity associated with a plurality of individuals.

Example 12: The system of any of Examples 8-11, wherein the target object is a wanted object associated with at least a number of activities within a predetermined time period.

Example 13: The system of any of Examples 8-12, wherein the updated target information comprises an object identification code and an updated quantity of the target object.

Example 14: The system of any of Examples 8-13, further comprising:

determining that the updated target information in the database deviates from expected target object information; and transmitting an alert to a computing device.

Example 15: A non-transitory computer-readable storage medium including program code which when executed by at least one processor causes operations comprising:

receiving initial data corresponding to activity of a target object;

generating unprocessed data, wherein the unprocessed data comprises a distinct plurality of chronology indicators and corresponding target object counts, based on the initial data;

determining a chronology indicator of an actual count of the target object;

identifying the unprocessed data having a chronology indicator equal to or before the chronology indicator of the actual count of the target object;

selectively compiling only the identified unprocessed data having a chronology indicator equal to or before the chronology indicator of the actual count of the target object; and updating target information in a database based on the selective compiling and the actual count of the target object.

Example 16: The non-transitory computer-readable storage medium of Example 15, wherein the selective compiling comprises filtering out the unprocessed data having a chronology indicator after the chronology indicator of the actual count and before the updating.

Example 17: The non-transitory computer-readable storage medium of Example 15-16, wherein the unprocessed data comprises individual target object activity as per receipt data from a register device.

Example 18: The non-transitory computer-readable storage medium of Example 15-17, wherein the unprocessed data corresponds to target object activity associated with a plurality of individuals.

Example 19: The non-transitory computer-readable storage medium of Example 15-18, wherein the target object is a wanted object associated with at least a number of activities within a predetermined time period.

Example 20: The non-transitory computer-readable storage medium of Example 15-19, wherein the updated target information comprises an object identification code and an updated quantity of the target object.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer-implemented method comprising:

receiving initial data corresponding to activity of a target object;

generating unprocessed data, wherein the unprocessed data comprises a distinct plurality of chronology indicators and corresponding target object counts, based on the initial data;

determining a chronology indicator of an actual count of the target object;

identifying the unprocessed data having a chronology indicator equal to or before the chronology indicator of the actual count of the target object;

selectively compiling only the identified unprocessed data having a chronology indicator equal to or before the chronology indicator of the actual count of the target object; and updating target information in a database based on the selective compiling and the actual count of the target object.

2. The computer-implemented method of claim 1, wherein the selective compiling comprises filtering out the unprocessed data having a chronology indicator after the chronology indicator of the actual count and before the updating.

3. The computer-implemented method of claim 1, wherein the unprocessed data comprises individual target object activity as per receipt data from a register device.

4. The computer-implemented method of claim 1, wherein the unprocessed data corresponds to target object activity associated with a plurality of individuals.

5. The computer-implemented method of claim 1, wherein the target object is a wanted object associated with at least a number of activities within a predetermined time period.

6. The computer-implemented method of claim 1, wherein the updated target information comprises an object identification code and an updated quantity of the target object.

7. The computer-implemented method of claim 1, further comprising:

determining that the updated target information in the database deviates from expected target object information; and transmitting an alert to a computing device.

8. A system comprising:

at least one processor; and at least one memory including program code which when executed causes the system to provide operations comprising:

receiving initial data corresponding to activity of a target object;

generating unprocessed data, wherein the unprocessed data comprises a distinct plurality of chronology indicators and corresponding target object counts, based on the initial data;

determining a chronology indicator of an actual count of the target object;

identifying the unprocessed data having a chronology indicator equal to or before the chronology indicator of the actual count of the target object;

selectively compiling only the identified unprocessed data having a chronology indicator equal to or before the chronology indicator of the actual count of the target object; and updating target information in a database based on the selective compiling and the actual count of the target object.

9. The system of claim 8, wherein the selective compiling comprises filtering out the unprocessed data having a chronology indicator after the chronology indicator of the actual count and before the updating.

10. The system of claim 8, wherein the unprocessed data comprises individual target object activity as per receipt data from a register device.

11. The system of claim 8, wherein the unprocessed data corresponds to target object activity associated with a plurality of individuals.

12. The system of claim 8, wherein the target object is a wanted object associated with at least a number of activities within a predetermined time period.

13. The system of claim 8, wherein the updated target information comprises an object identification code and an updated quantity of the target object.

14. The system of claim 8, further comprising:

determining that the updated target information in the database deviates from expected target object information; and transmitting an alert to a computing device.

15. A non-transitory computer-readable storage medium including program code which when executed by at least one processor causes operations comprising:

receiving initial data corresponding to activity of a target object;

generating unprocessed data, wherein the unprocessed data comprises a distinct plurality of chronology indicators and corresponding target object counts, based on the initial data;

determining a chronology indicator of an actual count of the target object;

identifying the unprocessed data having a chronology indicator equal to or before the chronology indicator of the actual count of the target object;

selectively compiling only the identified unprocessed data having a chronology indicator equal to or before the chronology indicator of the actual count of the target object; and updating target information in a database based on the selective compiling and the actual count of the target object.

16. The non-transitory computer-readable storage medium of claim 15, wherein the selective compiling comprises filtering out the unprocessed data having a chronology indicator after the chronology indicator of the actual count and before the updating.

17. The non-transitory computer-readable storage medium of claim 15, wherein the unprocessed data comprises individual target object activity as per receipt data from a register device.

18. The non-transitory computer-readable storage medium of claim 15, wherein the unprocessed data corresponds to target object activity associated with a plurality of individuals.

19. The non-transitory computer-readable storage medium of claim 15, wherein the target object is a wanted object associated with at least a number of activities within a predetermined time period.

20. The non-transitory computer-readable storage medium of claim 15, wherein the updated target information comprises an object identification code and an updated quantity of the target object.

* * * * *